(12) United States Patent
Discenzo et al.

(10) Patent No.: US 7,143,016 B1
(45) Date of Patent: Nov. 28, 2006

(54) SYSTEM AND METHOD FOR DYNAMIC MULTI-OBJECTIVE OPTIMIZATION OF PUMPING SYSTEM OPERATION AND DIAGNOSTICS

(75) Inventors: Frederick M. Discenzo, Brecksville, OH (US); Dukki Chung, Mayfield Heights, OH (US); Joseph K. Zevchek, Brunswick, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 713 days.

(21) Appl. No.: 09/964,939

(22) Filed: Sep. 27, 2001

Related U.S. Application Data

(60) Provisional application No. 60/273,023, filed on Mar. 2, 2001.

(51) Int. Cl.
*G06G 7/48* (2006.01)
(52) U.S. Cl. ........................................................ 703/3
(58) Field of Classification Search ............... 700/9, 700/275, 276, 282, 289, 291, 170; 417/1–6, 417/321, 16, 17, 22; 318/544, 112, 152, 318/257, 268, 433; 363/74, 105, 149, 164; 62/228.1; 303/156
See application file for complete search history.

(56) References Cited

U.S. PATENT DOCUMENTS

| | | | | |
|---|---|---|---|---|
| 3,068,796 A | * | 12/1962 | Pfluger et al. ................. 137/8 |
| 3,610,779 A | * | 10/1971 | Hubby ........................ 417/215 |
| 3,797,966 A | * | 3/1974 | Randell ........................ 417/13 |
| 3,947,738 A | * | 3/1976 | Oliver ........................ 388/806 |
| 4,019,107 A | * | 4/1977 | Dixon et al. ................. 388/806 |
| 4,076,458 A | * | 2/1978 | Jones ........................... 417/46 |
| 4,204,808 A | * | 5/1980 | Reese et al. ................... 417/2 |
| 4,432,064 A | * | 2/1984 | Barker et al. .................. 702/9 |
| 4,584,654 A | * | 4/1986 | Crane .......................... 702/44 |
| 4,733,146 A | * | 3/1988 | Hamby ....................... 388/847 |
| 5,351,705 A | * | 10/1994 | Reinders et al. .............. 137/12 |
| 5,659,485 A | * | 8/1997 | Lee ............................. 700/282 |
| 5,742,500 A | * | 4/1998 | Irvin ............................. 700/9 |
| 5,780,990 A | * | 7/1998 | Weber ........................ 318/807 |
| 5,796,236 A | * | 8/1998 | Royak ........................ 318/804 |

(Continued)

OTHER PUBLICATIONS

Motorola, Inc ., "High-Current DC Motor Drive Uses Low On-Resistance Surface Mount MOSFETs", 1992.*

(Continued)

*Primary Examiner*—Albert W. Paladini
(74) *Attorney, Agent, or Firm*—Amin Turocy & Calvin LLP; Alexander R. Kuszewski; William R. Walbrun

(57) ABSTRACT

Control systems and methodologies are disclosed for controlling a process having one or more motorized pumps and an associated motor drives, which comprise selecting a desired operating point within an allowable range of operation about a process setpoint according to performance characteristics associated with a plurality of components in the process, and controlling the system according to the desired operating point. The control system comprises a motor drive providing electrical power to a motor in a controlled fashion according to a control signal, and a controller providing the control signal to the motor drive according to a desired operating point within an allowable range of operation about a process setpoint. The controller selects the desired operating point according to one or more performance characteristics or criteria associated with a plurality of components in the process, such as cost, throughput, lifetime, or the like. Also disclosed are methods and systems for diagnosing operating conditions in a pump or other motorized device.

35 Claims, 11 Drawing Sheets

U.S. PATENT DOCUMENTS

| | | | | |
|---|---|---|---|---|
| 5,939,807 | A | * | 8/1999 | Patyk et al. .................. 310/89 |
| 5,943,223 | A | * | 8/1999 | Pond ........................... 363/53 |
| 5,952,798 | A | * | 9/1999 | Jones et al. ................. 318/268 |
| 6,014,598 | A | * | 1/2000 | Duyar et al. .................. 701/29 |
| 6,260,004 | B1 | * | 7/2001 | Hays et al. ................. 702/183 |
| 6,272,950 | B1 | * | 8/2001 | Braun et al. ............... 74/731.1 |
| 6,330,525 | B1 | | 12/2001 | Hays et al. ................. 702/183 |
| 6,379,119 | B1 | * | 4/2002 | Truninger .................... 417/22 |
| 6,463,748 | B1 | * | 10/2002 | Benedict et al. ........... 62/228.1 |
| 6,592,192 | B1 | * | 7/2003 | Kaneda et al. .............. 303/156 |

OTHER PUBLICATIONS

Lawrie, "Guidelines for motor application designs", May 1, 1996.*

Webster, "Wiley Encyclopedia of Electrical and Electronics Engineering", vol. 13, 1999.*

* cited by examiner

SYSTEM AND METHOD FOR DYNAMIC MULTI-OBJECTIVE OPTIMIZATION OF PUMPING SYSTEM OPERATION AND DIAGNOSTICS

CROSS REFERENCE TO RELATED APPLICATIONS

The present application claims the benefit of U.S. Provisional Patent Application Ser. No. 60/273,023, filed Mar. 2, 2001, entitled SYSTEM AND METHOD FOR DYNAMIC MULTI-OBJECTIVE OPTIMIZATION OF PUMPING SYSTEM OPERATION AND DIAGNOSTICS.

TECHNICAL FIELD

The present invention relates to the art of electric machines and more particularly to control system and methods for controlling machinery.

BACKGROUND OF THE INVENTION

Many industrial processes and machines are controlled and/or powered by electric motors. Such processes and machines include pumps providing fluid transport for chemical and other processes, fans, conveyor systems, compressors, gear boxes, motion control devices, screw pumps, and mixers, as well as hydraulic and pneumatic machines driven by motors. Such motors are combined with other system components, such as valves, pumps, furnaces, heaters, chillers, conveyor rollers, fans, compressors, gearboxes, and the like, as well as with appropriate motor drives, to form industrial machines and actuators. For example, an electric motor may be combined with a motor drive providing variable electrical power to the motor, as well as with a pump, whereby the motor rotates the pump shaft to create a controllable pumping system.

The components parts used to build such motorized systems (e.g., pumps, motors, motor drives, etc.) are commonly chosen according to specifications for a particular application in which the motorized system is to be employed. For instance, a set of specifications for a motorized pumping system may include flow rates or pressures or ranges thereof, which the system must accommodate for use in a particular application. In such a case, the pump is chosen according to the maximum and minimum flow and head required in the application, and the motor is selected based on the chosen pump. The corresponding motor drive is selected according to the motor specifications. Other pumping system components may then be selected according to the chosen motor, pump, and motor drive, which may include motor speed sensors, pressure sensors, flow sensors, and the like.

Such system design specifications are typically driven by maximum operating conditions, such as the maximum flow rate the pumping system is to achieve, which in turn drives the specifications for the component parts. For instance, the motor may be selected according to the ability to provide the necessary shaft speed and torque for the pump to achieve the maximum flow rate. Thus, the typical motorized system comprises components rated according to maximum operational performance. However, the system may seldom, if ever, be operated at these levels. For example, a pump system rated to achieve a maximum flow rate of 100 gallons per minute (GPM) may be operated at a much lower flow rate for the majority of its operation life.

In facilities where such motorized systems are employed, other operational performances characteristics may be of interest, apart from the rated output of the motorized system. For instance, the cost of operating a pumping system is commonly of interest in a manufacturing facility employing the system. The component parts of such a pumping system typically include performance ratings or curves relating to the efficiency of the component parts at various operating conditions. The energy efficiency, for example, may be a measure of the transferred power of the component device, which may be expressed as a percentage of the ratio of output power (e.g., power delivered by the device) to input power (e.g., power consumed by the device). These performance curves typically include one or more operating points at which the component operates at maximum efficiency. In addition to the optimal efficiency operating point, the components may have other operating points at which other performance characteristics are optimal, such as expected lifetime, mean time between failures (MTBF), audible noise or vibration output, time between expected servicing, safety, pollution emissions, or the like.

While the operating specifications for the components in a motorized (e.g., pumping) system may provide for component device selection to achieve one or more system operational maxima (e.g., maximum flow rate for a pumping system), other performance metrics (e.g., efficiency, cost, lifetime, MTBF, etc.) for the components and/or the system of which they form a part, are not typically optimal at the actual operating conditions. Thus, even where the efficiency ratings for a pump, motor, and motor drive in a motorized pumping system provide for maximum efficiency at or near the maximum flow rate specified for the pumping system, the efficiency of one or more of these components (e.g., as well as that of the pumping system overall) may be relatively poor for other flow rates at which the system may operate for the majority of the service life thereof. Thus, there is a need for methods and systems by which efficiency and other performance characteristics associated with motorized systems and components thereof may be improved.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter. The invention provides control systems and methodologies for controlling a process having one or more motorized pumps and associated motor drives, which provide for optimized process performance according to one or more performance criteria, such as efficiency, component life expectancy, safety, emissions, noise, vibration, operational cost, or the like.

In addition, control systems and methods are provided for controlling a motorized system according to a setpoint (e.g., flow rate for a motorized pump system), operating limits, and a diagnostic signal, wherein the diagnostic signal is related to a diagnosed operating condition in the system (e.g., efficiency, motor fault, system component degradation, pump cavitation, etc.). The invention thus provides for controlled operation of motors and motorized systems, wherein operation thereof takes into account desired process performance, such as control according to a process setpoint, as well as one or more other performance characteristics or metrics, related to the motorized system and/or component devices therein, whereby improvements in efficiency and other performance characteristics may be realized with allowable process and machinery operating constraints.

According to one aspect of the present invention, a method is provided for controlling a motorized system. A desired operating point is selected within an allowable range of operation about a system setpoint according to performance characteristics associated with a plurality of components in the system. For example, a flow rate setpoint may be provided for a motorized pump system, and a range may be provided (e.g., +/−10%) for the system to operate around the setpoint flow value. The system may be operated at an operating point within this range at which one or more performance characteristics are optimized in accordance with the invention. Thus, for example, where an allowable flow control range and setpoint provide for control between upper and lower acceptable flow rates, the invention provides for selecting the operating point therebetween in order to optimize one or more system and/or component performance characteristics, such as life cycle cost, efficiency, life expectancy, safety, emissions, operational cost, MTBF, noise, and vibration.

Where the motorized system includes an electric motor operatively coupled with a pump and a motor drive providing electrical power to the motor, the performance characteristics may include efficiencies or other metrics related to the motor, the pump, and/or the motor drive. The selection of the desired operating point may comprise correlating one or more of motor efficiency information, pump efficiency information, and motor drive efficiency information in order to derive correlated system efficiency information. The desired operating point may then be selected as the optimum efficiency point within the allowable range of operation according to the correlated system efficiency information. The efficiency of the individual component devices, and hence of the pumping system, may be associated with the cost of electrical energy or power provided to the system. Consequently, the invention may be employed to control the pumping system so as to minimize the power consumed by the system, within the tolerance of the allowable range about the process setpoint.

The invention thus allows a system operator to minimize or otherwise optimize the cost associated with pumping fluid, where for example, the cost per unit fluid pumped is minimized. Alternatively or in combination, other performance characteristics may be optimized or accounted for in the optimization in order to select the desired operating point within the allowable range. For instance, the component performance information may comprise component life cycle cost information, component efficiency information, component life expectancy information, safety information, emissions information, operational cost information, component MTBF information, noise information, and/or vibration information. In this regard, it will be recognized that value of one or more system performance variables (e.g., temperature, flow, pressure, power, etc.) may be used in determining or selecting the desired operating point, which may be obtained through one or more sensors associated with the system.

Another aspect of the invention provides a control system for controlling a process having a pump with an associated motor. The control system comprises a motor drive providing electrical power to the motor in a controlled fashion according to a control signal, and a controller providing the control signal to the motor drive according to a desired operating point within an allowable range of operation about a process setpoint. The controller selects the desired operating point according to performance characteristics associated one or more components in the process. The system may further comprise a user interface for obtaining from a user, the setpoint, allowable operating range, component performance information, and/or performance characteristic (s), which are to be optimized.

In addition, the system may obtain such information from a host computer and/or other control systems within a larger process via a network or wireless communications. Moreover, this information may be obtained via a global communications network, such as the Internet. In this regard, the optimization of one or more performance characteristics may be optimized on a global or process-wide basis, where, for example, a single pump system may be operated at a less than optimal efficiency in order to facilitate the operation of a larger (e.g., multi-pump) process or system more efficiently.

Yet another aspect of the invention provides for operating a motorized system, wherein a controller operatively associated with the system includes a diagnostic component to diagnose an operating condition associated with the pump. The operating conditions detected by the diagnostic component may include motor or pump faults, or failure and/or degradation, and/or failure prediction (e.g., prognostics) in one or more system components. The controller provides a control signal to the system motor drive according to a setpoint and a diagnostic signal from the diagnostic component according to the diagnosed operating condition in the pump. The diagnostic component may perform signature analysis of signals from one or more sensors associated with the pump or motorized system, in order to diagnose the operating condition.

Thus, for example, signal processing may be performed in order to ascertain wear, failure, remaining useful lifetime, or other deleterious effects on system performance, whereby the control of the system may be modified in order to prevent further degradation, extend the remaining service life of one or more system components, or to prevent unnecessary stress to other system components. In this regard, the diagnostic component may process signals related to flow, pressure, current, noise, vibration, and temperature associated with the motorized system.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
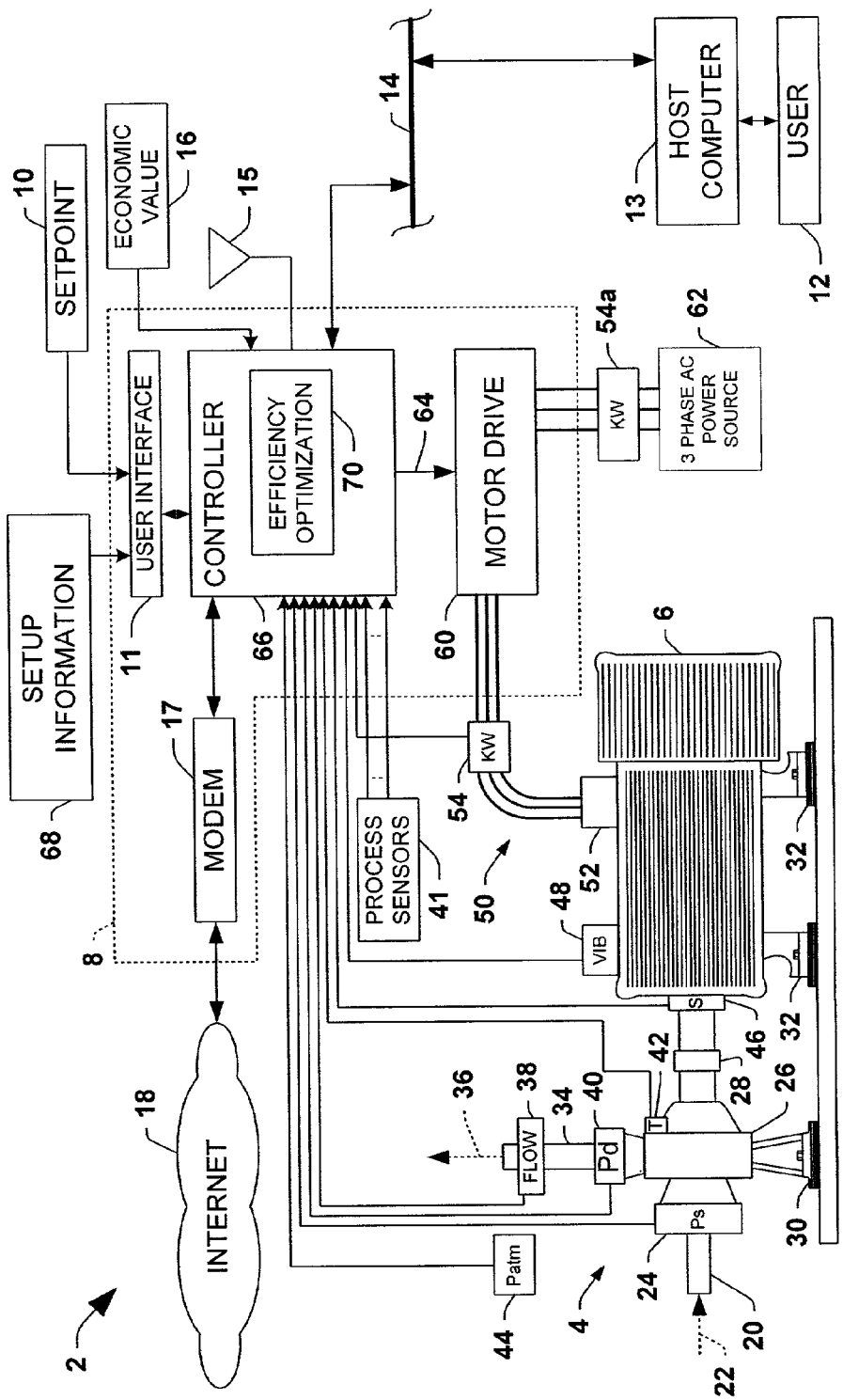
FIG. 1 is a side elevation view illustrating an exemplary motorized pump system and a control system therefor with an optimization component in accordance with an aspect of the present invention.

The various aspects of the present invention will now be described with reference to the drawings, wherein like reference numerals are used to refer to like elements throughout. The invention provides methods and system for controlling a motorized system in order to achieve setpoint operation, as well as to optimize one or more performance characteristics associated with the system within specified operating constraints. The invention is hereinafter illustrated with respect to one or more motorized pump systems and controls therefor. However, it will be appreciated that one or more aspects of the invention may be employed in operating other motorized systems, including but not limited to fans, conveyor systems, HVAC systems, compressors, gear boxes, motion control devices, screw pumps, mixers, as well as hydraulic and pneumatic machines driven by motors.

In addition, the attached figures and corresponding description below illustrate the invention in association with optimizing system and/or component efficiency, although it will be recognized that other performance characteristics of a motorized system may be optimized individually or in combination, which performance characteristics may include, but are not limited to, life cycle cost, efficiency, life expectancy, safety, throughput, emissions, operational cost, MTBF, noise, vibration, energy usage, and the like. Furthermore, the aspects of the invention may be employed to provide for optimization at a higher system level, wherein a process comprises a plurality of motorized systems, such that one or more performance characteristics of the entire process are optimized globally.

In FIG. 1, an exemplary motorized pump system 2 is illustrated having a pump 4, a three phase electric motor 6, and a control system 8 for operating the system 2 in accordance with a setpoint 10. While the exemplary motor 6 is illustrated and described herein as a polyphase synchronous electric motor, the various aspects of the present invention may be employed in association with single-phase motors as well as with DC and other types of motors. In addition, the pump 4 may comprise a centrifugal type pump, however, the invention finds application in association with other pump types not illustrated herein, for example, positive displacement pumps.

The control system 8 operates the pump 4 via the motor 6 according to the setpoint 10 and one or more measured process variables, in order to maintain operation of the system 2 commensurate with the setpoint 10 and within allowable process operating ranges specified in setup information 68, supplied to the control system 8 via a user interface 11. For example, it may be desired to provide a constant fluid flow, wherein the value of the setpoint 10 is a desired flow rate in gallons per minute (GPM) or other engineering units. The setup information 68, moreover, may comprise an allowable range of operation about the setpoint 10 (e.g., expressed in GPM, percentage of process variable span, or other units), and allowable range of operation for other process and machinery parameters such as temperature, pressure, or noise emission, wherein the control system 8 may operate the system 2 at an operating point within the allowable range.

Alternatively or in combination, setup information, setpoints, and other information may be provided to the control system 8 by a user 12 via a host computer 13 operatively connected to a network 14, and/or by wireless communications via a transceiver 15. Such information may be provided via the network 14 and/or the wireless communications transceiver 15 from a host computer (e.g., computer 13) and/or from other controllers such as a programmable logic controller (PLC, not shown) in a larger process, wherein the setpoint 10, setup information, and/or one or more economic values 16 (e.g., related to or indicative of energy costs, which may vary with time, peak loading values, and current loading conditions, material viscosity values, and the like) are provided to the control system 8, as illustrated and described in greater detail hereinafter. The control system 8, moreover, may include a modem 17 allowing communication with other devices and/or users via a global communications network, such as the Internet 18, whereby such setpoint, setup, performance, and other information may be obtained or provided to or from remote computers or users. In this regard, it will be appreciated that modem 17 is not strictly required for Internet or other network access.

The pump 4 comprises an inlet opening 20 through which fluid is provided to the pump 4 in the direction of arrow 22 as well as a suction pressure sensor 24, which senses the inlet or suction pressure at the inlet 20 and provides a corresponding suction pressure signal to the control system 8. Fluid is provided from the inlet 20 to an impeller housing 26 including an impeller (not shown), which rotates together with a rotary pump shaft coupled to the motor 6 via a coupling 28. The impeller housing 26 and the motor 6 are mounted in a fixed relationship with respect to one another via a pump mount 30, and motor mounts 32. The impeller with appropriate fin geometry rotates within the housing 26 so as to create a pressure differential between the inlet 20 and an outlet 34 of the pump. This causes fluid from the inlet 20 to flow out of the pump 4 via the outlet or discharge tube 34 in the direction of arrow 36. The flow rate of fluid through the outlet 34 is measured by a flow sensor 38, which provides a flow rate signal to the control system 8.

In addition, the discharge or outlet pressure is measured by a pressure sensor 40, which is operatively associated with the outlet 34 and provides a discharge pressure signal to the control system 8. It will be noted at this point that although one or more sensors (e.g., suction pressure sensor 24, discharge pressure sensor 40, outlet flow sensor 38, and others) are illustrated in the exemplary system 2 as being associated with and/or proximate to the pump 4, that such sensors may be located remote from the pump 4, and may be associated with other components in a process or system (not shown) in which the pump system 2 is employed. In this regard, other process sensors 41 may be connected so as to provide signals to the control system 8, for example, to indicate upstream or downstream pressures, flows, or the like. Alternatively, flow may be approximated rather than measured by utilizing pressure differential information, pump speed, fluid properties, and pump geometry information or a pump model. Alternatively or in combination, inlet and/or discharge pressure values may be estimated according to other sensor signals (e.g., 41) and pump/process information.

It will be further appreciated that while the motor drive 60 is illustrated in the control system 8 as separate from the motor 6 and from the controller 66, that some or all of these components may be integrated. Thus, for example, an integrated, intelligent motor may be provided integral to or embedded with the motor 6, to include the motor drive 60 and the controller 66. Furthermore, the motor 6 and the pump 4 may be integrated into a single unit (e.g., having a common shaft wherein no coupling 28 is required), with or without integral control system (e.g., control system 8, comprising the motor drive 60 and the controller 66) in accordance with the invention.

The control system 8 further receives process variable measurement signals relating to pump temperature via a temperature sensor 42, atmospheric pressure via a pressure sensor 44 located proximate the pump 4, motor (pump) rotational speed via a speed sensor 46, and vibration via sensor 48. Although the vibration sensor 48 is illustrated and described hereinafter as mounted on the motor 6, vibration information may, alternatively or in combination, be obtained from a vibration sensor mounted on the pump 6 (not shown). The motor 6 provides rotation of the impeller of the pump 4 according to three-phase alternating current (AC) electrical power provided from the control system via power cables 50 and a junction box 52 on the housing of the motor 6. The power to the pump 4 may be determined by measuring the current and voltage provided to the motor 6 and computing pump power based on current, voltage, speed, and motor model information such as efficiency. This may be measured and computed by a power sensor 54, which provides a signal related thereto to the control system 8. Alternatively or in combination, the motor drive 60 may provide motor torque information to the controller 66 where pump input power is calculated according to the torque and possibly speed information. Alternatively, input current and possibly voltage may be measured from the power lines going from the power source 62 to the motor drive 60 using a sensor 54a. Drive efficiency and/or motor efficiency equations may be used to determine the power going into the pump 4. It will be noted that either or both of the sensors 54 and 54a can be integrated into the motor drive 60.

The control system 8 also comprises a motor drive 60 providing three-phase electric power from an AC power source 62 to the motor 6 via the cables 50 in a controlled fashion (e.g., at a controlled frequency and amplitude) in accordance with a control signal 64 from a controller 66. The controller 66 receives the process variable measurement signals from the atmospheric pressure sensor 44, the suction pressure sensor 24, the discharge pressure sensor 40, the flow sensor 38, the temperature sensor 42, the speed sensor 46, the vibration sensor 48, the power sensor 54, and other process sensors 41, together with the setpoint 10, and provides the control signal 64 to the motor drive 60 in order to operate the pump system 2 commensurate with the setpoint 10 within specified operating limits. In this regard, the controller 66 may be adapted to control the system 2 to maintain a desired fluid flow rate, outlet pressure, motor (pump) speed, torque, suction pressure, or other performance characteristic.

Setup information 68 may be provided to the controller 66, which may include operating limits (e.g., min/max speeds, min/max flows, min/max pump power levels, min/max pressures allowed, NPSHR values, and the like), such as are appropriate for a given pump 4, motor 6, piping and process conditions, and/or process dynamics and other system constraints. The control system 8 provides for operation within an allowable operating range about the setpoint 10, whereby the system 2 is operated at a desired operating point within the allowable range, in order to optimize one or more performance characteristics (e.g., such as life cycle cost, efficiency, life expectancy, safety, emissions, operational cost, MTBF, noise, vibration, and the like).

Figure 2:
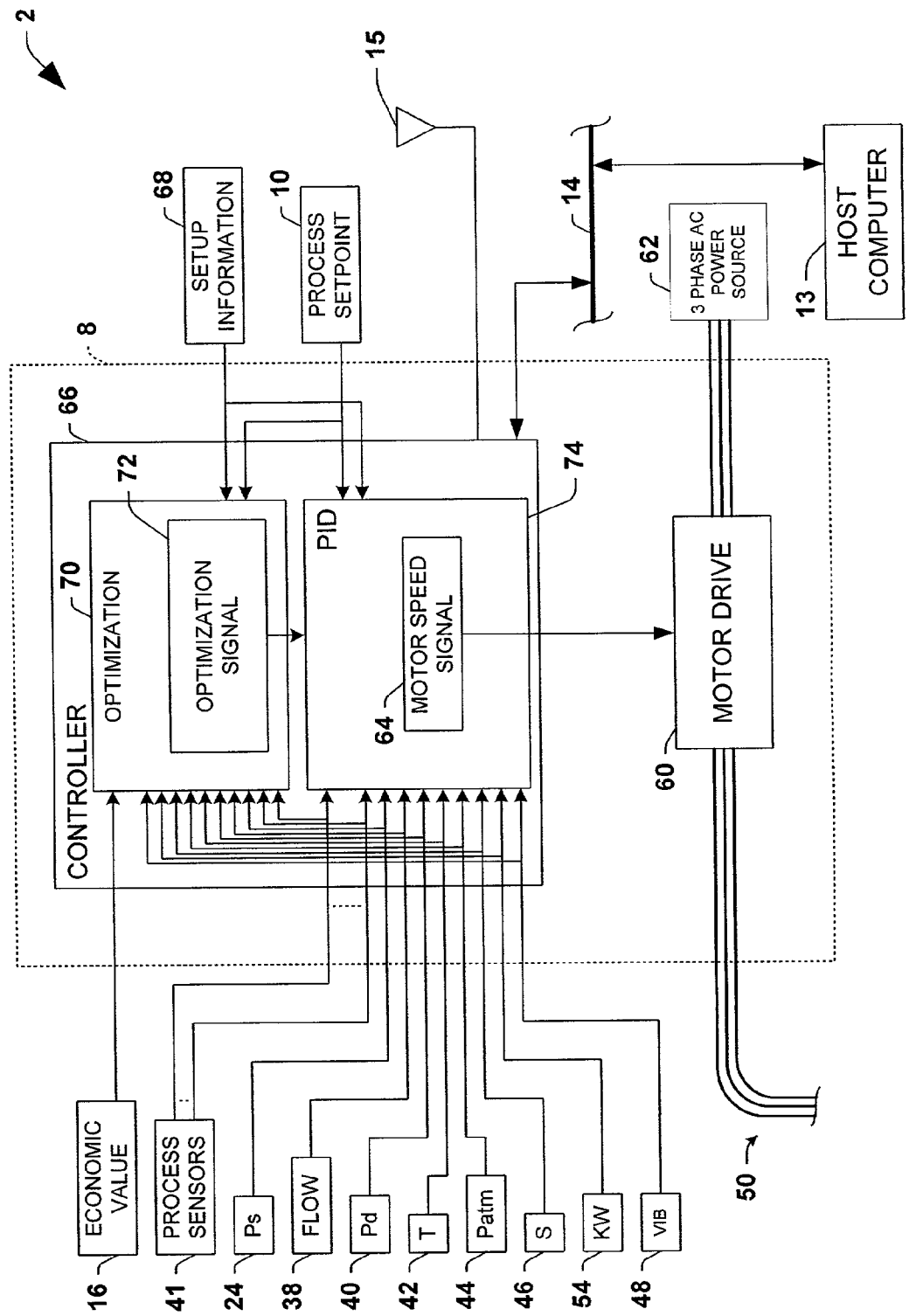
FIG. 2 is a schematic diagram illustrating further details of the exemplary control system of FIG. 1.

Refrring also to FIG. 2, the controller 66 comprises an optimization component 70, which is adapted to select the desired operating point for pump operation within the allowable range about the setpoint 10, according to an aspect of the invention. As illustrated and described hereinafter, the optimization component 70 may be employed to optimize efficiency or other performance characteristics or criteria, including but not limited to throughput, lifetime, or the like. The component 70, moreover, may select the desired operating point according to performance characteristics associated with one or more components in the system 2 or associated therewith. For example, the optimization component 70 may generate an optimization signal 72 by correlating pump, motor, and or motor drive efficiency information associated with the pump 4, motor 6, and motor drive 60, respectively, to derive a correlated process efficiency associated with the entire system 2.

Such component efficiency information may be obtained, for example, from setup information 68 such as efficiency curves for the pump 4, motor 6, and drive 60 alone or in combination with such information derived from one or more of the sensors 24, 38, 40, 41, 42, 44, 46, 54, 54a, and/or 48. In this manner, the efficiency of a particular component (e.g., pump 4, motor 6, and drive 60) in the system 2 may be determined from manufacturer data, which may be supplemented, enhanced, or replaced with actual measured or computed efficiency information based on prior operation and/or diagnosis of one or more such components.

The optimization component 70, moreover, may correlate efficiency information related to the components 4, 6, and 60 of the system 60, along with such efficiency information related to components of a larger process or system of which the system 2 is a part, in order to select the desired operating point for optimization of overall system efficiency. Thus, for example, the controller 66 may generate the control signal 64 to the motor drive 60 according to the optimization signal 72 from the optimization component 70, based on the optimum efficiency point within the allowable operating range according to the correlated process efficiency for the system 2. Furthermore, it will be appreciated that performance information associated with components in unrelated systems may be employed (e.g., efficiency information related to motors in other, unrelated systems within a manufacturing facility) in optimizing energy usage across the entire facility.

Alternatively or in combination, the controller 66 may operate the pump within the allowable range about the setpoint 10 in order to achieve global optimization of one or more performance characteristics of a larger process or system of which the pump system 2 is a part. Thus, for example, the components (e.g., pump 4, motor 6, drive 60) of the system 2 may be operated at less than optimal efficiency in order to allow or facilitate operation of such a larger process at optimal efficiency. The controller 66 selectively provides the control signal 64 to the motor drive 60 according to the setpoint 10 (e.g., in order to maintain or regulate a desired flow rate) as well as to optimize a performance characteristic associated with the system 2 or a larger process, via the optimization signal 72. Thus, in one example flow control is how optimization is achieved in this example. It will be noted that the allowable range of operation may be provided in lieu of an actual setpoint, or the allowable range may be derived using the setpoint value 10.

In this regard, the controller 66 may provide the control signal 64 as a motor speed signal 64 from a PID control component 74, which inputs process values from one or more of the sensors 24, 38, 40, 42, 44, 46, 48, 54, and 54a, economic values 16, and the setpoint 10, wherein the magnitude of change in the control signal 64 may be related to the degree of correction required to accommodate the present control strategy, for example, such as system efficiency, and/or the error in required versus measured process variable (e.g., flow). Although the exemplary controller 66 is illustrated and described herein as comprising a PID control component 74, control systems and controllers implementing other types of control strategies or algorithms (e.g., PI control, PID with additional compensating blocks or elements, stochastics, non-linear control, state-space control, model reference, adaptive control, self-tuning, sliding mode, neural networks, GA, fuzzy logic, operations research (OR), linear programming (LP), dynamic programming (DP), steepest descent, or the like) are also contemplated as falling within the scope of the present invention.

The exemplary PID component 74 may compare a measured process variable (e.g., flow rate measured by sensor 38) with the desired operating point within the allowable range about the setpoint 10, where the setpoint 10 is a target setpoint flow rate, and wherein one or more of the process variable(s) and/or the desired operating point (e.g., as well as the allowable operating range about the setpoint) may be scaled accordingly, in order to determine an error value (not shown). The error value may then be used to generate the motor speed signal 64, wherein the signal 64 may vary proportionally according to the error value, and/or the derivative of the error, and/or the integral of the error, according to known PID control methods.

The controller 66 may comprise hardware and/or software (not shown) in order to accomplish control of the process 2. For example, the controller 66 may comprise a microprocessor (not shown) executing program instructions for implementing PID control (e.g., PID component 74), implementing the efficiency or other performance characteristic optimization component 70, inputting of values from the sensor signals, providing the control signal 64 to the motor drive 60, and interacting with the user interface 11, network 14, modem 17, and the transceiver 15. The user interface 11 may allow a user to input setpoint 10, setup information 68, and other information, and in addition may render status and other information to the user, such as system conditions, operating mode, diagnostic information, and the like, as well as permitting the user to start and stop the system and override previous operating limits and controls. The controller 66 may further include signal conditioning circuitry for conditioning the process variable signals from the sensors 16, 24, 38, 40, 41, 42, 44, 46, 48, and/or 54.

The controller 66, moreover, may be integral with or separate from the motor drive 60. For example, the controller 66 may comprise an embedded processor circuit board mounted in a common enclosure (not shown) with the motor drive 60, wherein sensor signals from the sensors 16, 24, 38, 40, 41, 42, 44, 46, 48, and/or 54 are fed into the enclosure, together with electrical power lines, interfaces to the network 14, connections for the modem 17, and the transceiver 15, and wherein the setpoint 10 may be obtained from the user interface 11 mounted on the enclosure, and/or via a network, wireless, or Internet connection. Alternatively, the controller 66 may reside as instructions in the memory of the motor drive 60, which may be computed on an embedded processor circuit that controls the motor 6 in the motor drive 60.

In addition, it will be appreciated that the motor drive 60 may further include control and feedback components (not shown), whereby a desired motor speed (e.g., as indicated by the motor speed control signal 64 from the PID component 74) is achieved and regulated via provision of appropriate electrical power (e.g., amplitude, frequency, phasing, etc.) from the source 62 to the motor 6, regardless of load fluctuations, and/or other process disturbances or noise. In this regard, the motor drive 60 may also obtain motor speed feedback information, such as from the speed sensor 46 via appropriate signal connections (not shown) in order to provide closed loop speed control according to the motor speed control signal 64 from the controller 66. In addition, it will be appreciated that the motor drive 60 may obtain motor speed feedback information by means other than the sensor 46, such as through internally computed speed values, as well as torque feedback information, and that such speed feedback information may be provided to the controller 66, whereby the sensor 46 need not be included in the system 2. One control technique where the motor drive 60 may obtain torque and speed information without sensors is when running in a vector-control mode.

Figure 3:
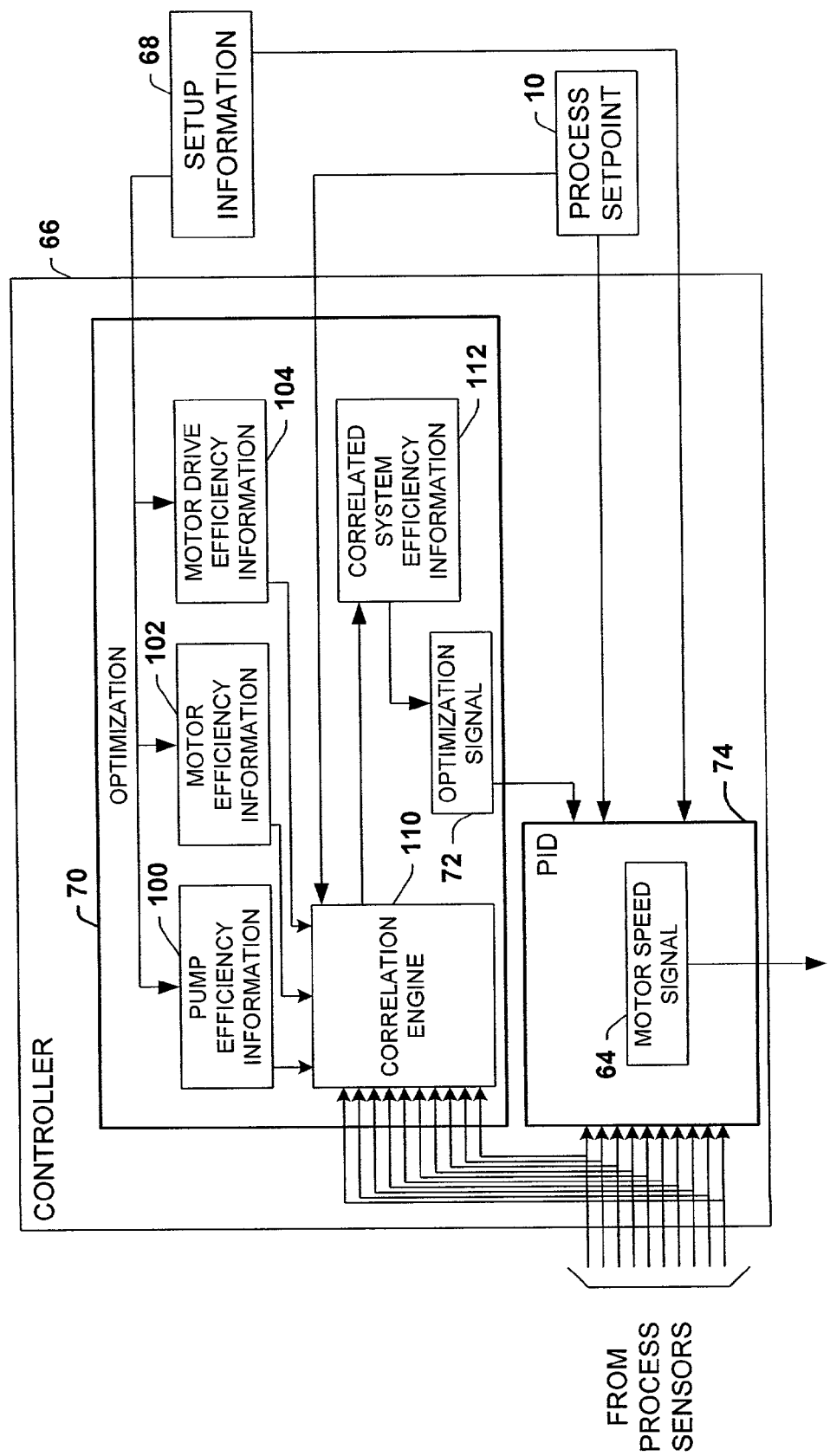
FIG. 3 is a schematic diagram further illustrating the efficiency optimization component and controller of FIGS. 1 and 2.

As further illustrated in FIG. 3, the optimization component 70 correlates component performance information (e.g., efficiency information) associated with one or more components (e.g., pump 4, motor 6, motor drive 60, etc.) in the system 2 in order to derive correlated process performance information. In addition, the component 70 may employ performance information associated with other components in a larger process (not shown) of which the system 2 is a part, in order to derive correlated performance information. It will be appreciated that the optimization component 70, moreover, may correlate information other than (or in addition to) efficiency information, including but not limited to life cycle cost, efficiency, life expectancy, safety, emissions, operational cost, MTBF, noise, vibration, and the like.

The optimization component 70 selects the desired operating point as the optimum performance point within the allowable range of operation according to the correlated process performance information. As illustrated in FIG. 3, the controller 66 may obtain pump efficiency information 100 related to the pump 4, motor efficiency information 102 related to the motor 6, and motor drive efficiency information 104 related to the motor drive 60, which is provided to a correlation engine 110 in the optimization component 70. The correlation engine 110 correlates the information 100, 102, and/or 104 according to present operating conditions (e.g., as determined according to values from one or more of the process sensors 24, 38, 40, 41, 42, 44, 46, 48, and/or 54, economic value(s) 16, setpoint 10, and allowable operating range information from setup information 68) in order to determine a desired operating point within the allowable operating range at which the efficiency of the system 2 or a larger process (not shown) may be optimal.

In this regard, the correlation engine 110 may compute, predict, or derive correlated system efficiency information 112 from the correlation of one or more of the pump efficiency information 100 related to the pump 4, motor efficiency information 102 related to the motor 6, and motor drive efficiency information 104 related to the motor drive 60. The correlation may be accomplished in the correlation engine 110 through appropriate mathematical operations, for example, in software executing on a microprocessor within the controller 66. Appropriate weighting factors may be assigned to the relevant information being correlated (e.g., 100, 102, and 104), for instance, whereby the efficiency of the pump 4 may be given more weight than that of the motor drive 60. The invention can also be employed to provide near-optimal operation to enhance robustness (e.g., to reduce sensitivity), in order to provide better overall optimization.

The correlation engine 110, moreover, may determine correlated system efficiency information according to the current operating conditions of the system 2, such as the process setpoint 10, diagnosed degradation of system components, etc. Thus, for example, the correlated system efficiency information 112 may include different desired operating points depending on the setpoint 10, and/or according to the current pressures, flow rates, temperatures, vibration, power usage, etc., in the system 2, as determined by the values from one or more of the sensors 24, 38, 40, 41, 42, 44, 46, 48, and/or 54. The controller 66 then provides the control signal 64 as a motor speed signal 64 to the motor drive 60 according to the desired operating point. In addition to efficiency information (e.g., 100, 102, 104) the component performance information may also comprise one or more of life cycle cost information, efficiency information, life expectancy information, safety information, emissions information, operational cost information, MTBF information, noise information, and vibration information. The correlation engine 110 can also comprise algorithms employing temporal logic. This permits the correlation engine 110 to establish dynamic, time varying control signals to optimize system operation over a time horizon. For example, if energy costs are to rise during peak daytime periods, the correlation engine may prescribe a slightly higher throughput during off-peak hours (e.g., less energy efficient during off-peak hours) in order to minimize operation during more costly peak energy cost periods.

Figure 4:
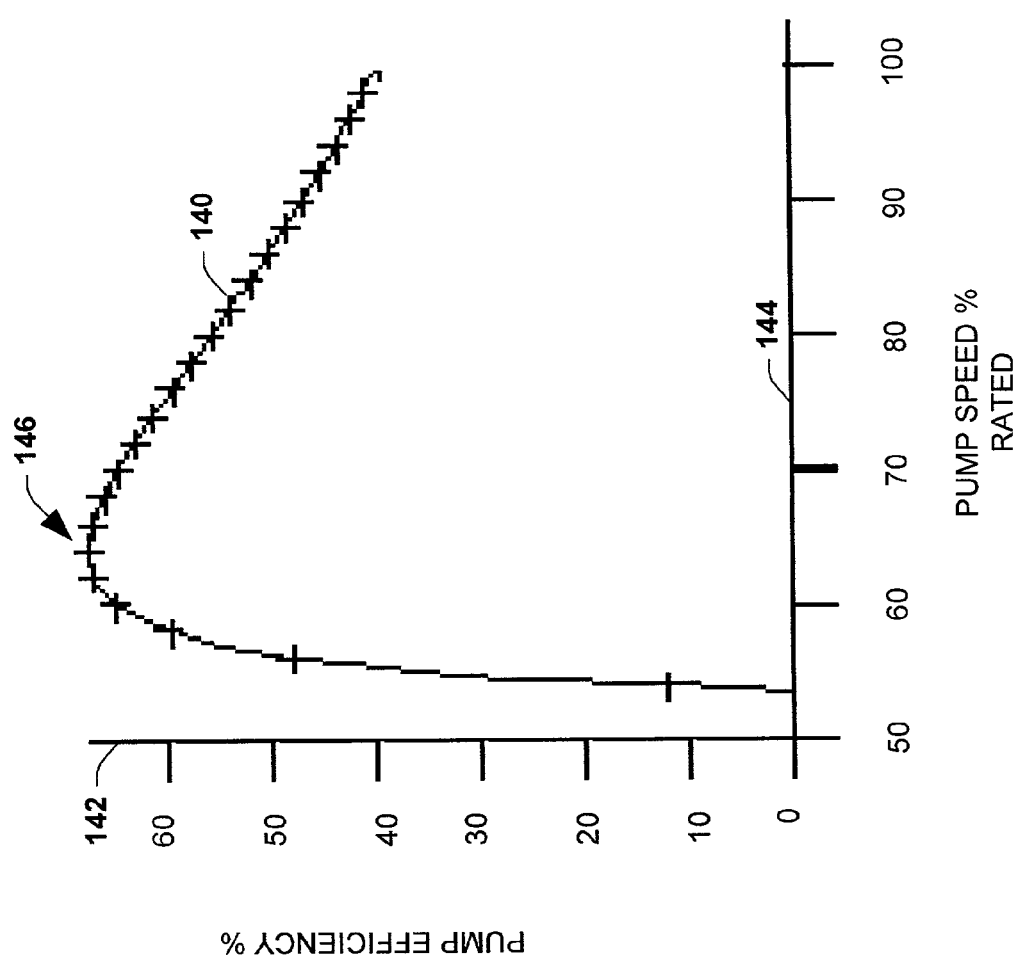
FIG. 4 is a plot showing an exemplary pump efficiency curve.
Figure 5:
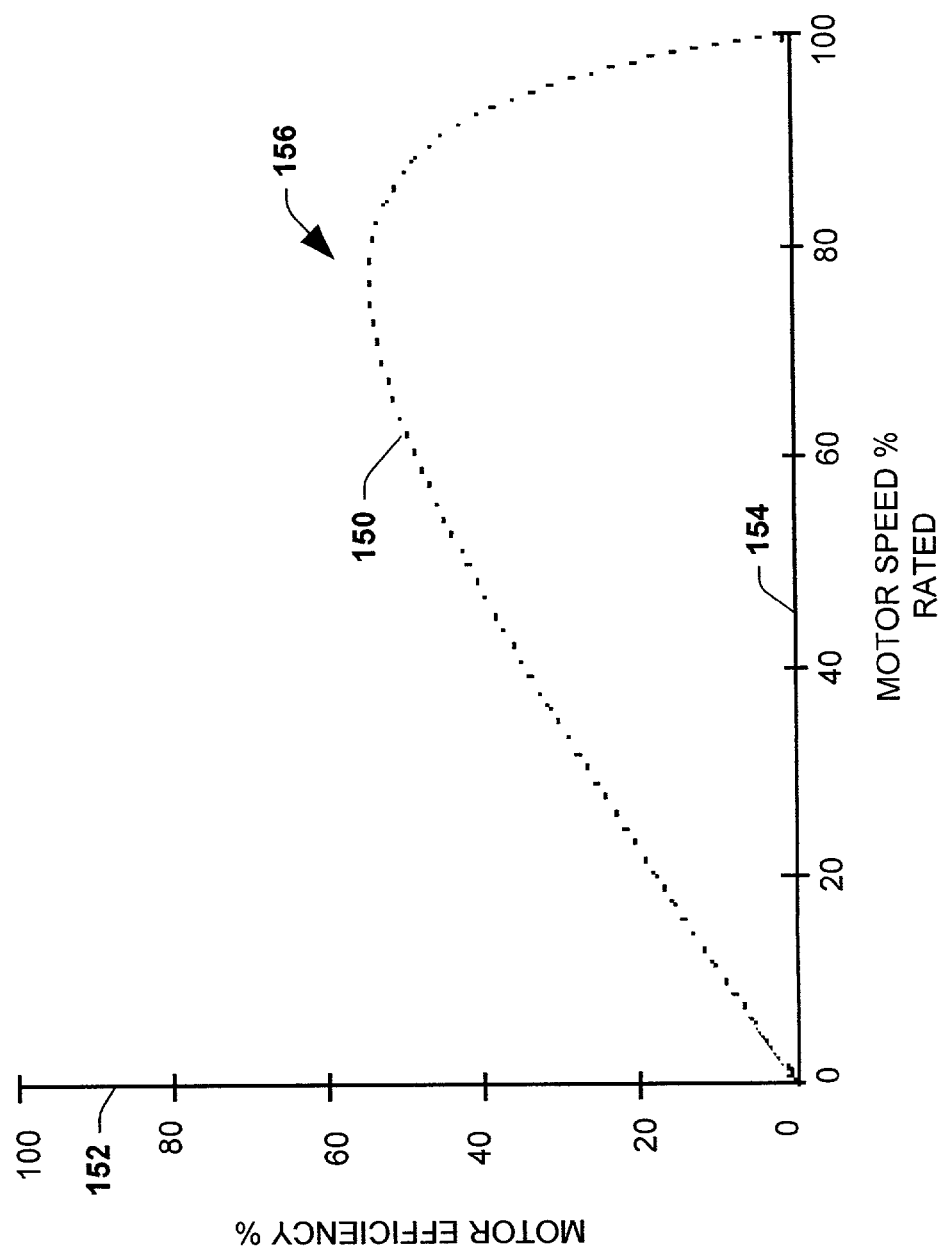
FIG. 5 is a plot showing an exemplary motor efficiency curve.
Figure 6:
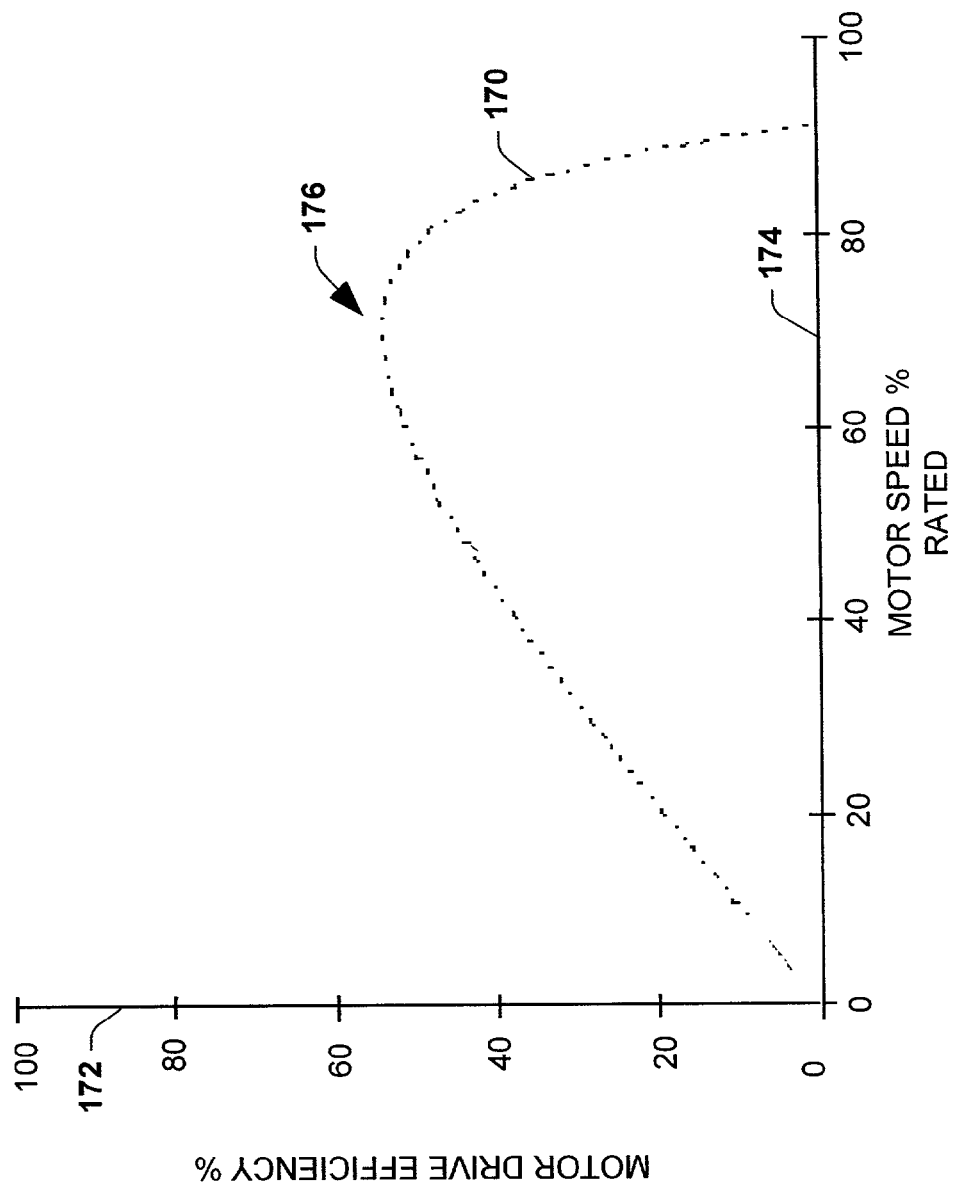
FIG. 6 is a plot showing an exemplary motor drive efficiency curve.

FIGS. 4–6 illustrate examples of component performance characteristic information, which may be correlated (e.g., via the correlation engine 110) in order to select the desired operating point for the system 2. FIG. 4 illustrates a plot of an exemplary pump efficiency curve 140 (e.g., related to pump 4), plotted as efficiency 142 (e.g., output power/input power) versus pump speed 144. The exemplary curve 140 comprises a best operating point 146, whereat the pump efficiency is optimal at approximately 62% of maximum rated pump speed. The pump efficiency information 100 of the optimization component 70 may comprise one or more such curves, for example, wherein different curves exist for different flow rates, pressures, temperatures, viscosity of pumped fluid, etc. Similarly, FIG. 5 illustrates a plot of an exemplary motor efficiency curve 150 (e.g., related to motor 6), plotted as efficiency 152 (e.g., output power/input power) versus motor speed 154. The exemplary curve 150 comprises a best operating point 156, whereat the motor efficiency is optimal at approximately 77% of maximum rated speed.

It will be appreciated from the curves 140 and 150 of FIGS. 4 and 5, respectively, that the optimal efficiency operating points for individual components (e.g., pump 4 and motor 6) of the system 2, or of typical motorized systems generally, may not, and seldom do, coincide. The pump efficiency information 100 of the optimization component 70 may comprise one or more such curves 146 of pump efficiency versus speed, for example, wherein a different curve exists for different flow rates, pressures, viscosity of pumped fluid, motor load, etc. In like fashion, FIG. 6 illustrates a plot of an exemplary motor drive efficiency curve 170 (e.g., related to the motor drive 60 of system 2), plotted as efficiency 172 (e.g., output power/input power) versus motor (e.g., pump) speed 174. The exemplary curve 170 comprises a best operating point 176, whereat the motor drive efficiency is optimal at approximately 70% of the rated speed. The motor drive efficiency information 104 of the optimization component 70 may comprise one or more such curves, for example, wherein a different curve exists for different flow rates, temperatures, torques, pressures, viscosity of pumped fluid, motor load, motor temperature, etc.

Figure 7:
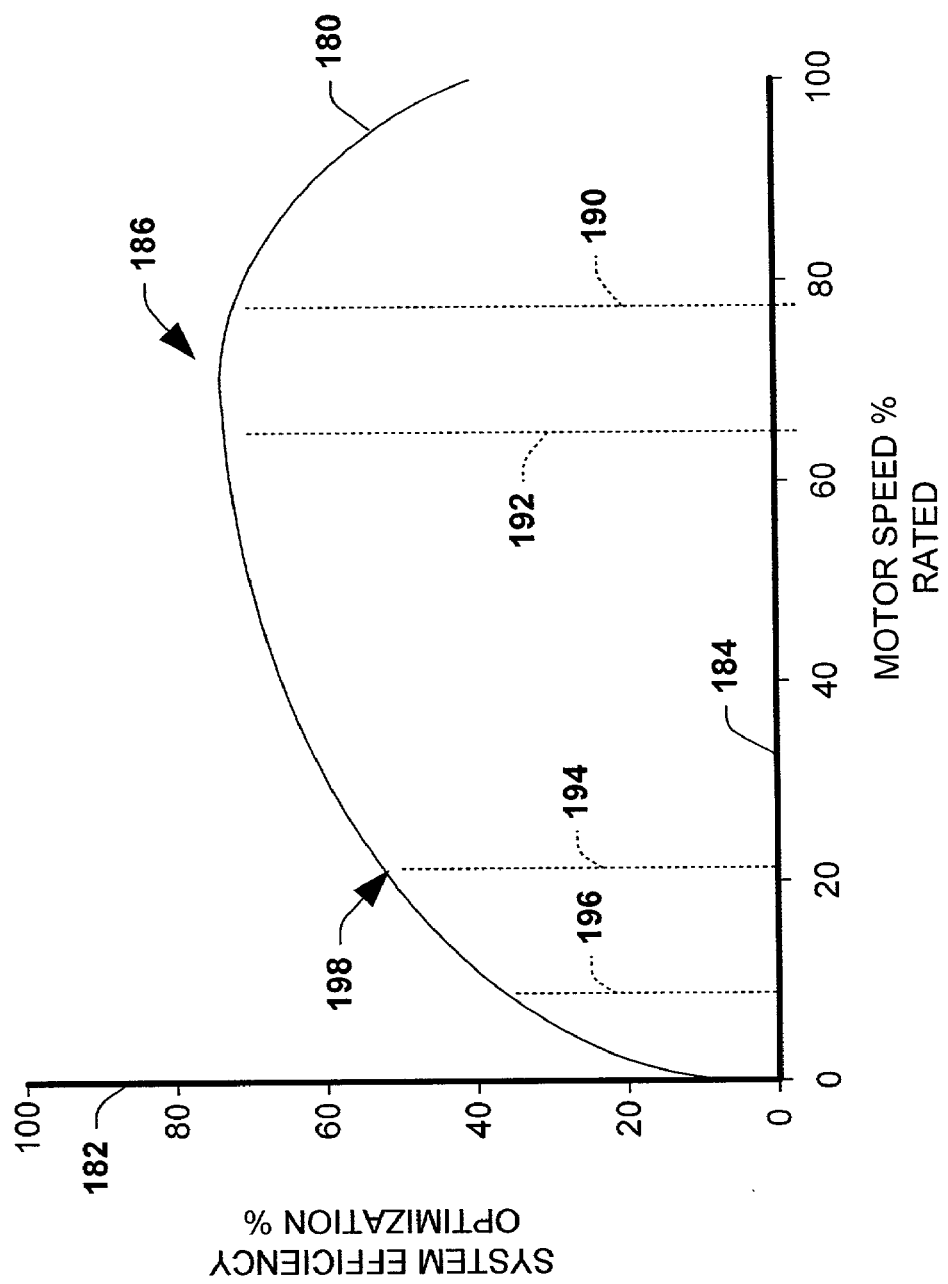
FIG. 7 is a plot showing an exemplary correlated pump system efficiency optimization curve in accordance with the invention.

The correlation engine 110 of the efficiency optimization component 70 correlates the three curves 140, 150, and 170 in order to derive correlated system efficiency information 112. Referring now to FIG. 7, the correlation engine may correlate the curves 140, 150, and 170 to derive a correlated system efficiency curve 180 plotted as system efficiency optimization 182 versus speed 184. The exemplary curve 180 comprises a peak optimization point 186 at approximately 71% of rated speed. This composite performance characteristic curve 180 may then be employed by the optimization component 70 in order to select the desired operation point for the system 2, which may be provided to the PID 74 via the optimization signal 72.

As illustrated in FIG. 7, where the allowable operating range includes an upper limit 190, and a lower limit 192 (e.g., where these limits 190 and 192 are scaled from process units, such as flow in GPM into speed), the optimization component 70 may advantageously select the peak optimization point 186 at approximately 71% of rated speed, in order to optimize the efficiency within the allowable operating range. In another example, where the allowable upper and lower limits 194 and 196 are specified, a local optimum 198 within that range may be selected as the desired operating point. Many other forms of performance information and correlations thereof are possible within the scope of the present invention, beyond those illustrated and described above with respect to FIGS. 4–7. The preceding discussion described sending a motor speed signal (e.g., signal 64) to the motor drive 60. Alternatively or in combination, other drive parameters (e.g., carrier frequency, control mode, gains, and the like) can be changed, enhanced, modified, etc., in accordance with the invention. This can enable even more efficient operation, for example, by changing the efficiency curve 180.

Figure 8:
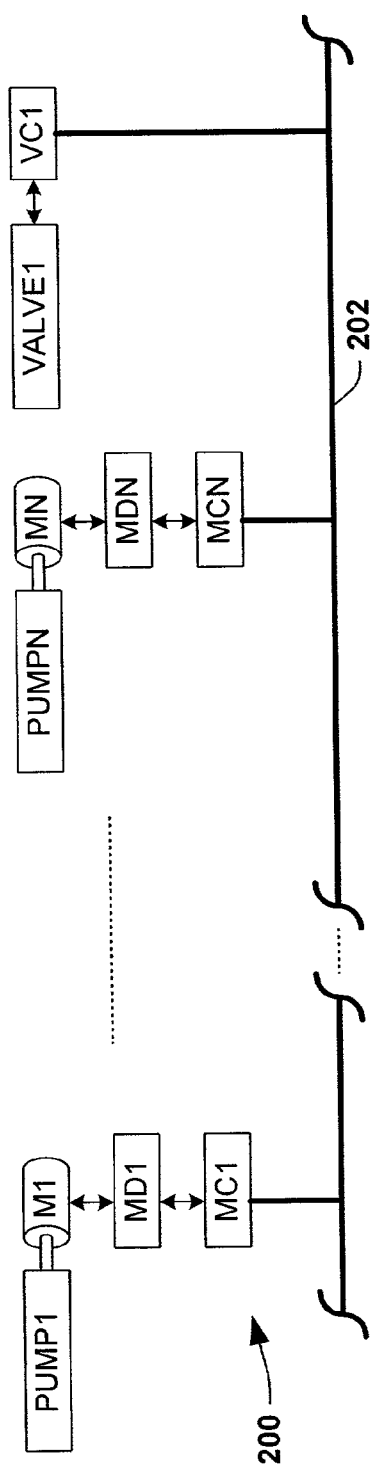
FIG. 8 is a schematic diagram illustrating an exemplary fluid transfer system having multiple pump and valve controllers networked for peer-to-peer communication according to an aspect of the invention.
Figure 9:
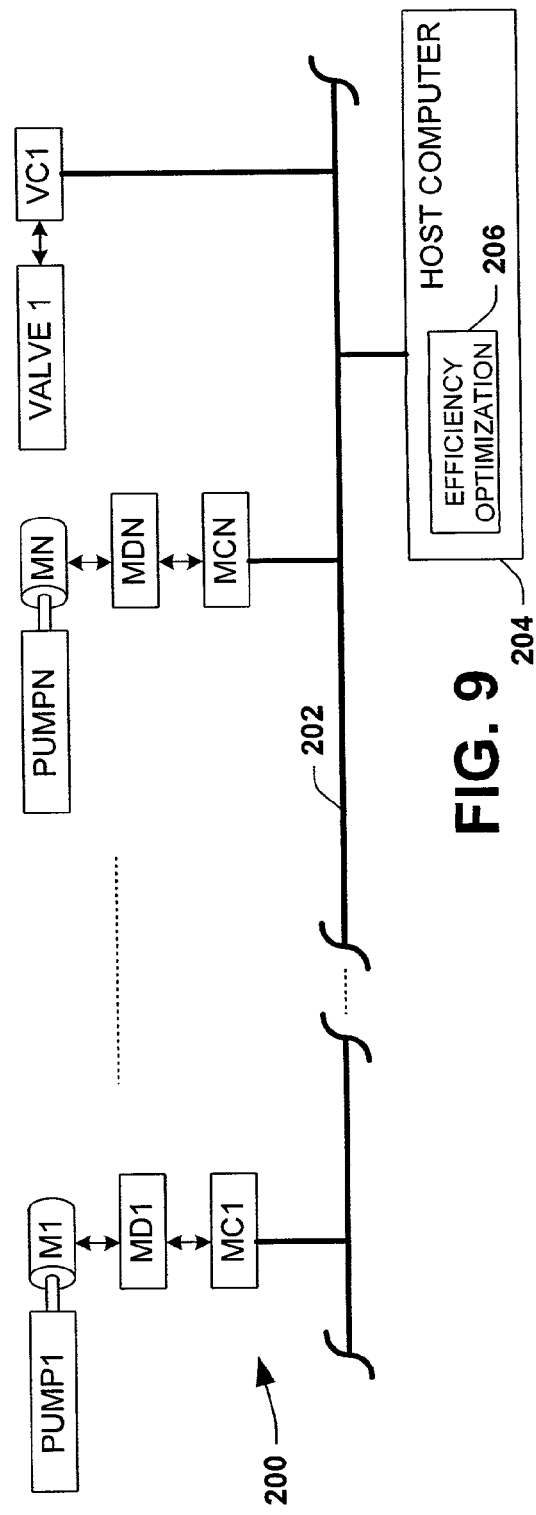
FIG. 9 is a schematic diagram illustrating another exemplary fluid transfer system having a host computer as well as multiple pump and valve controllers networked for peer-to-peer and/or host-to-peer communication according to an aspect of the invention.
Figure 10:
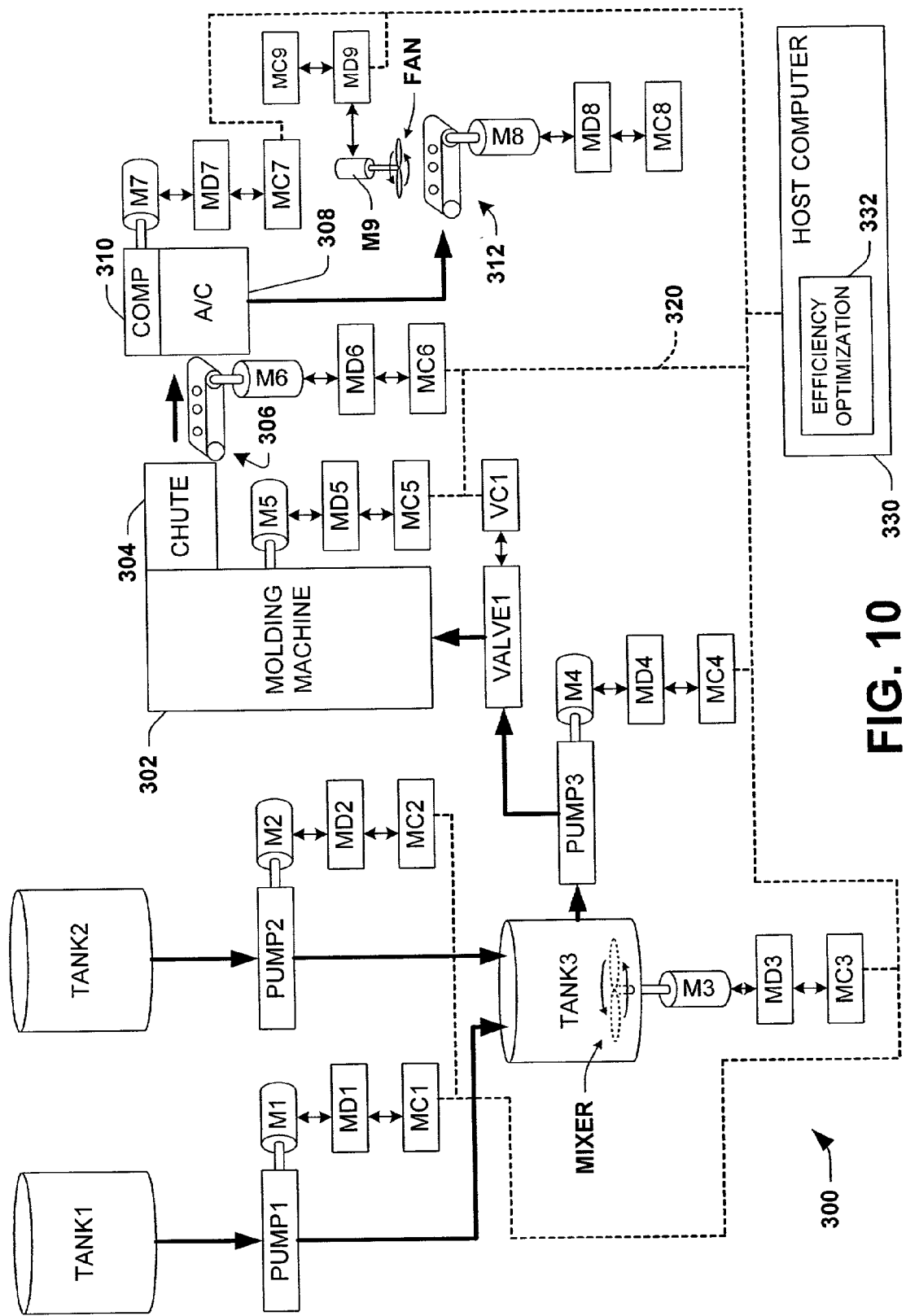
FIG. 10 is a schematic diagram illustrating an exemplary manufacturing system having multiple pump and valve controllers in which one or more aspects of the invention may be implemented.

Referring now to FIGS. 8–10, the optimization aspects of the invention may be employed across a plurality of controllers operating various actuators (e.g., valves, switches, and the like) and motorized systems (e.g., pumps, mixers, compressors, conveyors, fans, and the like) in a large process or system 200, for optimization of one or more performance characteristics for unrelated motorized systems. Such sub-systems may comprise individual controllers, such as valve controllers, motor controllers, as well as associated motors and drives. As illustrated in FIG. 8, an integer number N of such individual motor controllers MC1 through MCN may be networked together via a network 202, allowing peer-to-peer communication therebetween, wherein MC1 controls a motorized pump PUMP1 via a motor M1 and associated motor drive MD1, and MCN controls a motorized pump PUMPN via a motor MN and associated motor drive MDN. Other controllers, such as valve controller VC1 may be connected to the network 202, and operative to control a valve VALVE1.

The controllers MC1–MCN and VC1 may exchange information relating to process conditions (e.g., flow, pressure, power, efficiency, temperature, etc.), control information (e.g., setpoints, control outputs, alarm conditions, process limits, etc.), and performance characteristic information (e.g., related to life cycle cost information, efficiency information, life expectancy information, safety information, emissions information, operational cost information, MTBF information, noise information, vibration information, and the like). One or more of the individual controllers MC1, MCN, and VC1 may determine desired operating points for the associated sub-systems according to performance characteristic information obtained from other controllers via the network 202, and/or from sensors associated with the individual sub-systems.

Another possible configuration is illustrated in FIG. 9, wherein a host computer 204 is connected to the network 202. The host 204 may provide centralized operation of the pumps PUMP1 and PUMPN as well as of the valve VALVE1, for example, by providing setpoint information to the associated controllers MC1, MCN, and VC1. Other information may be exchanged between the computer 204 and the various controllers MC1, MCN, and VC1 in host-to-peer fashion, such as information relating to process conditions, control information, and performance characteristic information, whereby an efficiency optimization component 206 in the host computer 204 may determine desired operating points for one or more of the controllers MC1, MCN, and VC1 according to one or more performance characteristics associated with the system 200. Alternatively or in combination, one or more of the individual controllers MC1, MCN, and VC1 may determine desired operating points for the associated sub-systems according to performance characteristic information obtained from the host computer 204, from other controllers via the network 202, and/or from sensors associated with the individual sub-systems.

Referring now to FIG. 10, another process 300 is illustrated for providing material from first and second tanks TANK1 and TANK2 into a mixing tank TANK3 via pumps PUMP1 and PUMP2 with associated motors, drives and controllers. The material is mixed in TANK3 via a motorized mixer with associated motor M3, drive MD3, and controller MC3. Mixed material is then provided via a motorized pump PUMP3 and control valve VALVE1 to a molding machine 302 with an associated motor M5, whereafter molded parts exit the machine 302 via a chute 304 to a motorized conveyor 306 controlled by motor M6, which transports the molded parts to a cooler device 308 having a motorized compressor 310. The cooled parts are then provided to a second motorized conveyor 312 whereat a motorized fan facilitates removal of moisture from the parts.

The various motor and valve controllers MC1–MC9 and VC1 associated with the various sub-systems of the process 300 are networked together via a network 320 in order to provide peer-to-peer or other types of communications therebetween. One or more of these controllers MC1–MC9 and VC1 may be adapted to correlate performance characteristic information associated with component devices (e.g., motors, drives, valves) in order to determine desired operating points for one, some, or all of the sub-systems in the process 300 in accordance with the invention.

A host computer 332, moreover, may be provided on the network 320, which may comprise an optimization component 332 operative to determine desired operating points (e.g., as well as setpoints, allowable operating ranges about such setpoints, and the like) for one or more of the sub-systems in the process 300 according to one or more performance characteristics associated with the process 300, which may be then communicated to the various controllers MC1–MC9 and VC1 in order to optimize performance of the process 300 in some aspect (e.g., efficiency, cost, life cycle cost, throughput, efficiency, life expectancy, safety, emissions, operational cost, MTBF, noise, vibration, and the like). Thus, in accordance with the present invention, the process 300 may be operated to both produce molded parts from raw materials, and at the same time to optimize one or more performance metrics, such as cost per part produced.

Another aspect of the invention provides a methodology by which a motorized system may be controlled. The methodology comprises selecting a desired operating point within an allowable range of operation about a system setpoint according to performance characteristics associated with one or more components in the system, and controlling the system according to the desired operating point. The selection of the desired operating point may include correlating component performance information associated with one or more components in the system in order to derive correlated system performance information, and selecting the desired operating point as the optimum performance point within the allowable range of operation according to the correlated system performance information. The performance information, setpoint, and/or the allowable operating range may be obtained from a user or another device via a user interface, via a host computer or other controller through a network, via wireless communications, Internet, and/or according to prior operation of the system, such as through trend analysis.

Figure 11:
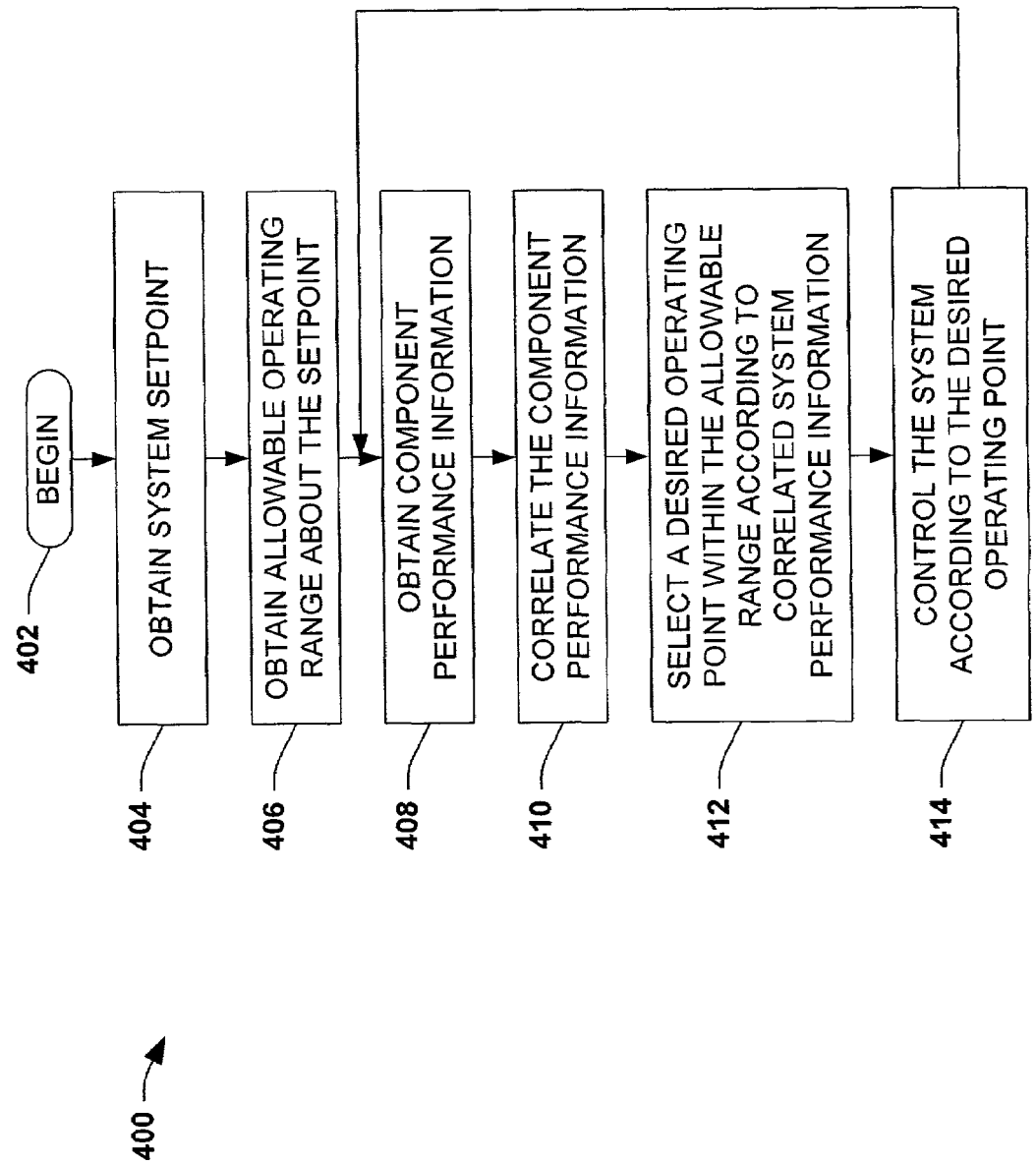
FIG. 11 is a flow diagram illustrating an exemplary method of controlling a motorized pump in accordance with another aspect of the invention.

An exemplary method 400 is illustrated in FIG. 11 for controlling a motorized system in accordance with this aspect of the invention. While the exemplary method 400 is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 400, as well as other methods according to the invention, may be implemented in association with the pumps and systems illustrated and described herein, as well as in association with other motorized systems and apparatus not illustrated or described, including but not limited to fans, conveyor systems, compressors, gear boxes, motion control devices, screw pumps, mixers, as well as hydraulic and pneumatic machines driven by motors or turbo generators.

Beginning at 402, the method 400 comprises obtaining a system setpoint at 404, and obtaining an allowable operating range at 406. The setpoint and operating range may be obtained at 404 and 406 from a user or a device such as a controller, a host computer, or the like, via a user interface, a network, an Internet connection, and/or via wireless communication. At 408, component performance information is obtained, which may be related to components in the system and/or components in a larger process of which the controlled system is a part. The component performance information is then correlated at 410 in order to derive correlated system performance information. At 412, a desired operating point is selected in the allowable operating range, according to the correlated system performance information derived at 410. The system is then controlled at 414 according to the desired operating point, whereafter the method 400 returns to 408 as described above. Process changes and disturbances may require periodic evaluation and appropriate control adjustment in order to ensure meeting optimum performance levels as the process changes (e.g., tanks empty, temperature changes, or the like).

Another aspect of the invention provides for controlling a motorized system, such as a pump, wherein a controller operatively associated with the system includes a diagnostic component to diagnose an operating condition associated with the pump. The operating conditions detected by the diagnostic component may include motor, motor drive, or pump faults, pump cavitation, failure and/or degradation in one or more system components, sensors, or incoming power, and the like. The controller provides a control signal to the system motor drive according to a setpoint and a diagnostic signal from the diagnostic component according to the diagnosed operating condition in the pump. The diagnostic component may perform signature analysis of signals from one or more sensors associated with the pump or motorized system, in order to diagnose the operating condition. Thus, for example, signal processing may be performed in order to ascertain wear, failure, or other deleterious effects on system performance, whereby the control of the system may be modified in order to prevent further degradation, extend the remaining service life of one or more system components, or to prevent unnecessary stress to other system components. In this regard, the diagnostic component may process signals related to flow, pressure, current, noise, vibration, temperature, and/or other parameters of metrics associated with the motorized system. Such a system will be able to effectively control the remaining useful life of the motorized system.

Figure 12:
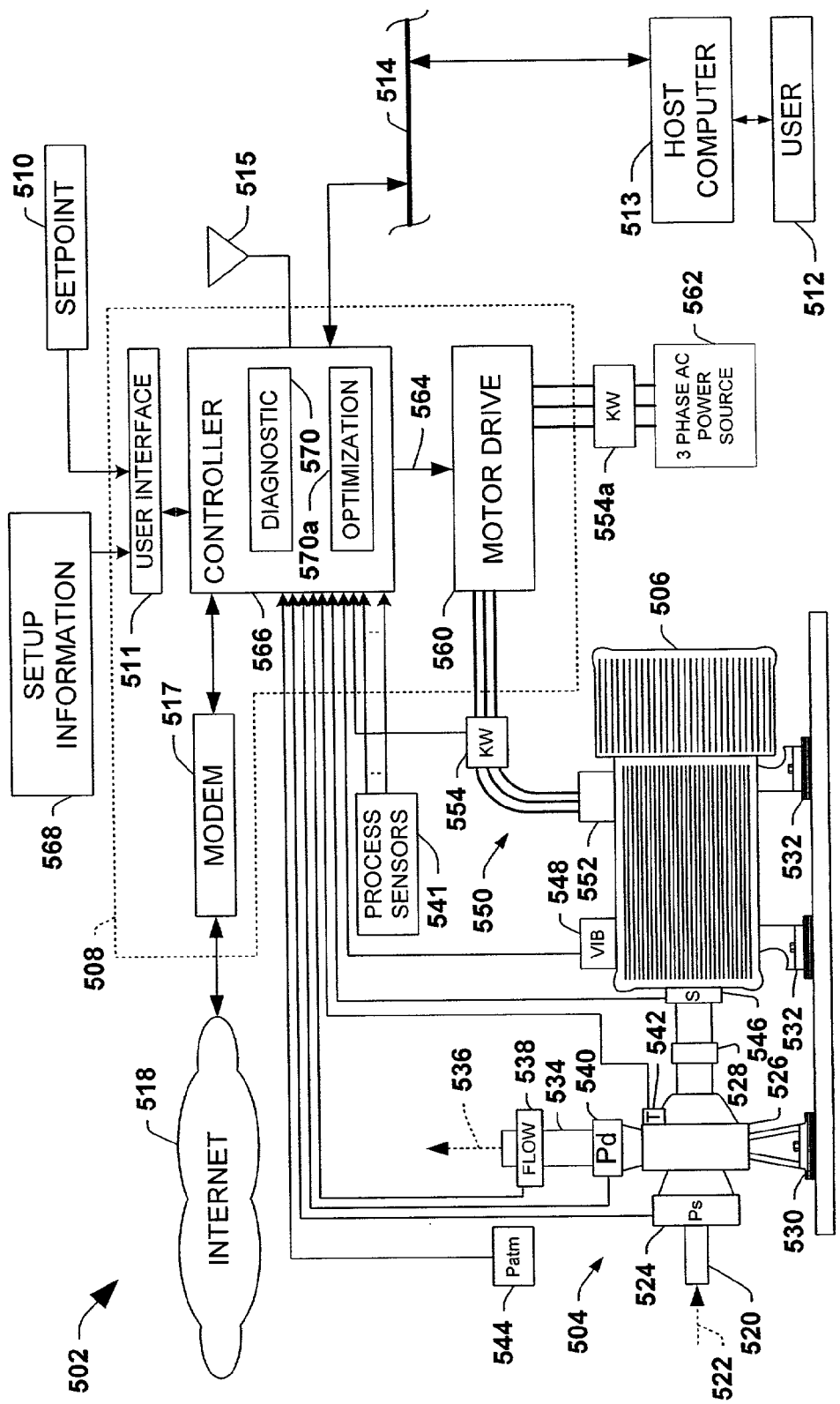
FIG. 12 is a side elevation view illustrating another exemplary motorized pump system and a control system therefor with a diagnostic component in accordance with another aspect of the invention.

Referring now to FIG. 12, another exemplary pump system 502 is illustrated, in which one or more aspects of the invention may be carried out. The system 502 includes a pump 504, a three phase electric motor 506, and a control system 508 for operating the system 502 in accordance with a setpoint 510. While the exemplary motor 506 is illustrated and described herein as a polyphase synchronous electric motor, the various aspects of the present invention may be employed in association with single-phase motors as well as with DC and other types of motors. In addition, the pump 504 may comprise a centrifugal type pump, however, the invention finds application in association with other pump types not illustrated herein, for example, positive displacement pumps.

The control system 508 operates the pump 504 via the motor 506 according to the setpoint 510 and one or more measured process variables, in order to maintain operation of the system 502 commensurate with the setpoint 510 and within the allowable process operating ranges specified in setup information 568, supplied to the control system 508 via a user interface 511. For example, it may be desired to provide a constant fluid flow, wherein the value of the setpoint 510 is a desired flow rate in gallons per minute (GPM) or other engineering units. The setup information 568, moreover, may comprise an allowable range of operation about the setpoint 510 (e.g., expressed in GPM, percentage of process variable span, or other units), wherein the control system 508 may operate the system 502 at an operating point within the allowable range.

Alternatively or in combination, setup information, setpoints, and other information may be provided to the control system 508 by a user 512 via a host computer 513 operatively connected to a network 514, and/or by wireless communications via a transceiver 515. Such information may be provided via the network 514 and/or the wireless communications transceiver 515 from a host computer (e.g., computer 513) and/or from other controllers (e.g., PLCs, not shown) in a larger process, wherein the setpoint 510, and/or setup information are provided to the control system 508, as illustrated and described in greater detail hereinafter. The control system 508, moreover, may include a modem 517 allowing communication with other devices and/or users via a global communications network, such as the Internet 518.

The pump 504 comprises an inlet opening 520 through which fluid is provided to the pump 504 in the direction of arrow 522 as well as a suction pressure sensor 524, which senses the inlet or suction pressure at the inlet 520 and provides a corresponding suction pressure signal to the control system 508. Fluid is provided from the inlet 520 to an impeller housing 526 including an impeller (not shown), which rotates together with a rotary pump shaft coupled to the motor 506 via a coupling 528. The impeller housing 526 and the motor 506 are mounted in a fixed relationship with respect to one another via a pump mount 530, and motor mounts 532. The impeller with appropriate fin geometry rotates within the housing 526 so as to create a pressure differential between the inlet 520 and an outlet 534 of the pump 504. This causes fluid from the inlet 520 to flow out of the pump 504 via the outlet or discharge tube 534 in the direction of arrow 536. The flow rate of fluid through the outlet 534 is measured by a flow sensor 538, which provides a flow rate signal to the control system 508.

In addition, the discharge or outlet pressure is measured by a pressure sensor 540, which is operatively associated with the outlet 534 and provides a discharge pressure signal to the control system 508. It will be noted at this point that although one or more sensors (e.g., suction pressure sensor 524, discharge pressure sensor 540, outlet flow sensor 538, and others) are illustrated in the exemplary system 502 as being associated with and/or proximate to the pump 504, that such sensors may be located remote from the pump 504, and may be associated with other components in a process or system (not shown) in which the pump system 502 is employed. In this regard, other process sensors 541 may be connected so as to provide signals to the control system 508, for example, to indicate upstream or downstream pressures, flows, temperatures, levels, or the like. Alternatively, flow may be approximated rather than measured by utilizing differential pressure information, pump speed, fluid properties, and pump geometry information or a pump model (e.g., CFD model). Alternatively or in combination, inlet and/or discharge pressure values may be estimated according to other sensor signals (e.g., 541) and pump/process information.

In addition, it will be appreciated that while the motor drive 560 is illustrated in the control system 508 as separate from the motor 506 and from the controller 566, that some or all of these components may be integrated. Thus, for example, an integrated, intelligent motor may be provided with the motor 506, the motor drive 560 and the controller 566. Furthermore, the motor 506 and the pump 504 may be integrated into a single unit (e.g., having a common shaft wherein no coupling 528 is required), with or without integral control system (e.g., control system 508, comprising the motor drive 560 and the controller 566) in accordance with the invention.

The control system 508 further receives process variable measurement signals relating to pump temperature via a temperature sensor 542, atmospheric pressure via a pressure sensor 544 located proximate the pump 504, motor (pump) rotational speed via a speed sensor 546, and vibration via sensor 548. The motor 506 provides rotation of the impeller of the pump 504 according to three-phase alternating current (AC) electrical power provided from the control system via power cables 550 and a junction box 552 on the housing of the motor 506. The power to the pump 504 may be determined by measuring the current provided to the motor 506 and computing pump power based on current, speed, and motor model information. This may be measured and computed by a power sensor 554 or 554A, which provides a signal related thereto to the control system 508. Alternatively or in combination, the motor drive 560 may provide motor torque information to the controller 566 where pump input power is calculated according to the torque and possibly speed information and motor model information.

The control system 508 also comprises a motor drive 560 providing three-phase electric power from an AC power source 562 to the motor 506 via the cables 550 in a controlled fashion (e.g., at a controlled frequency and amplitude) in accordance with a control signal 564 from a controller 566. The controller 566 receives the process variable measurement signals from the atmospheric pressure sensor 544 (554a), the suction pressure sensor 524, the discharge pressure sensor 540, the flow sensor 538, the temperature sensor 542, the speed sensor 546, the vibration sensor 548, the power sensor 554, and other process sensors 541, together with the setpoint 510, and provides the control signal 564 to the motor drive 560 in order to operate the pump system 502 commensurate with the setpoint 510. In this regard, the controller 566 may be adapted to control the system 502 to maintain a desired fluid flow rate, outlet pressure, motor (pump) speed, torque, suction pressure, tank level, or other performance characteristic.

Setup information 568 may be provided to the controller 566, which may include operating limits (e.g., min/max speeds, min/max flows, min/max pump power levels, min/max pressures allowed, NPSHR values, and the like), such as are appropriate for a given pump 504, motor 506, and piping and process conditions. The controller 566 comprises a diagnostic component 570, which is adapted to diagnose one or more operating conditions associated with the pump 504, the motor 506, the motor drive 560, and/or other components of system 502. In particular the controller 566 may employ the diagnostic component 570 to provide the control signal 564 to the motor drive 560 according to setpoint 510 and a diagnostic signal (not shown) from the diagnostic component 570 according to the diagnosed operating condition in the pump 504 or system 502. In this regard, the diagnosed operating condition may comprise motor or pump faults, pump cavitation, or failure and/or degradation in one or more system components. The controller 566 may further comprise an optimization component 570a, operating in similar fashion to the optimization component 70 illustrated and described above.

The diagnostic component may advantageously perform signature analysis of one or more sensor signals from the sensors 524, 538, 540, 541, 542, 544, 546, 548, and/or 554, associated with the pump 504 and/or the system 502 generally, in order to diagnose one or more operating conditions associated therewith. Such signature analysis may thus be performed with respect to power, torque, speed, flow, pressure, and other measured parameters in the system 504 of in a larger process of which the system 502 is a part. In addition, the signature analysis may comprise frequency analysis employing Fourier transforms, spectral analysis, space vector amplitude and angular fluctuation, neural networks, data fusion techniques, model-based techniques, discrete Fourier transforms (DFT), Gabor transforms, Wigner-Ville distributions, wavelet decomposition, non-linear filtering based statistical techniques, analysis of time series data using non-linear signal processing tools such as Poincare' maps and Lyapunov spectrum techniques, and other mathematical, statistical, and/or analytical techniques. The diagnostic features of the component 570, moreover, may be implemented in hardware, software, and/or combinations thereof in the controller 566.

Such techniques may be used to predict the future state or health of components in the system 502 (e.g., and/or those of a larger system of which system 502 is a part or with which system 502 is associated). This prognostics will enable the control to be altered to redistribute stress, to control the time to failure, and/or the remaining useful life of one or more such components or elements. It will be appreciated that such techniques may be employed in a larger system, such as the system 300 of FIG. 10, for example, wherein a known or believed good component or sub-system may be overstressed to allow another suspected weakened component to last longer.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. A method of controlling a system having at least one motorized pump and an associated motor drive, comprising:
    obtaining at least a portion of one of efficiency information, an allowable range, and a system setpoint from prior operation of the system;
    selecting a desired operating point within the allowable range of operation about the system setpoint according to performance characteristics associated with a plurality of components in the system; and
    automatically providing a control signal to the motor drive according to the desired operating point.

2. The method of claim 1, the system comprises a motorized pump system having an electric motor operatively coupled with a pump, and a motor drive providing electrical power to the motor, and the performance characteristics associated with a plurality of components in the system comprises efficiencies of at least two of the motor, the pump, and the motor drive.

3. The method of claim 2, further comprising obtaining the system setpoint and the allowable range of operation from a user.

4. The method of claim 2, selecting the desired operating point comprises:
    correlating at least two of motor efficiency information, pump efficiency information, and motor drive efficiency information in order to derive correlated system efficiency information; and
    selecting the desired operating point as the optimum efficiency point within the allowable range of operation according to the correlated system efficiency information.

5. The method of claim 4, further comprising obtaining at least one of the efficiency information, the allowable range, and the system setpoint from a user.

6. The method of claim 4, further comprising obtaining at least one of the efficiency information, the allowable range, and the system setpoint from a host computer.

7. The method of claim 6, the at least one of the efficiency information, the allowable range, and the system setpoint is obtained via a network.

8. The method of claim 7, the at least one of the efficiency information, the allowable range, and the system setpoint is obtained via wireless communications.

9. The method of claim 1, wherein selecting the desired operating point comprises:
    correlating component performance information associated with at least two components in the system in order to derive correlated system performance information; and
    selecting the desired operating point as the optimum performance point within the allowable range of operation according to the correlated system performance information.

10. The method of claim 9, controlling the system according to the desired operating point comprises providing a setpoint to a controller associated with the system according to the desired operating point.

11. The method of claim 9, further comprising obtaining at least one of the performance information, the allowable range, and the system setpoint from a user.

12. The method of claim 9, further comprising obtaining at least one of the performance information, the allowable range, and the system setpoint from a host computer.

13. The method of claim 12, the at least one of the performance information, the allowable range, and the system setpoint is obtained via a network.

14. The method of claim 13, the at least one of the performance information, the allowable range, and the system setpoint is obtained via wireless communications.

15. The method of claim 9, further comprising obtaining at least a portion of one of the performance information, the allowable range, and the system setpoint from prior operation of the system.

16. The method of claim 9, the component performance information comprises at least one of life cycle cost information, efficiency information, life expectancy information, safety information, emissions information, operational cost information, MTBF information, noise information, and vibration information.

17. The method of claim 16, the system comprises a motorized pump system for pumping fluid, having an electric motor operatively coupled with a pump, and a motor drive providing electrical power to the motor, wherein the component performance information comprises efficiency information related to at least two of the motor, the pump, and the motor drive, and the correlated system performance information comprises cost information related to the system operational cost per unit of fluid pumped.

18. The method of claim 1, the system comprises a motorized pump system having an electric motor operatively coupled with a pump, and a motor drive providing electrical power to the motor, and the performance characteristic associated with a plurality of components in the system comprises life expectancies of at least two of the motor, the pump, and the motor drive.

19. The method of claim 1, the system comprises a motorized pump system having an electric motor operatively coupled with a pump, and a motor drive providing electrical power to the motor, and the performance characteristics associated with a plurality of components in the system comprises cost of operation associated with at least two of the motor, the pump, and the motor drive.

20. The method of claim 1, selecting the desired operating point comprises measuring at least one process variable from a sensor associated with the system.

21. A control system for controlling a process having a pump with an associated motor, the control system comprising:
    a motor drive providing electrical power to the motor in a controlled fashion according to a control signal; and
    a controller that obtains at least one of efficiency information, an allowable range and a process setpoint from a user via a user interface, the controller further provides the control signal to the motor drive according to a desired operating point within an allowable range of operation about a process setpoint and selects the desired operating point according to performance characteristics associated with a plurality of components in the process.

22. The control system of claim 21, the performance characteristics associated with a plurality of components in the process comprises efficiencies of at least two of the motor, the pump, and the motor drive.

23. The control system of claim 21, the controller is adapted to correlate at least two of motor efficiency information, pump efficiency information, and motor drive efficiency information in order to derive correlated process efficiency information, and to select the desired operating point as the optimum efficiency point within the allowable range of operation according to the correlated process efficiency information.

24. The control system of claim 23, the controller provides the control signal as a motor speed signal to the motor drive according to the desired operating point.

25. The control system of claim 23, the controller comprises a network interface operatively connecting the controller with a host computer through a network, and the controller obtains at least one of the efficiency information, the allowable range, and the process setpoint from the host computer via the network.

26. The control system of claim 23, the controller comprises a wireless communication device, and the controller obtains the at least one of the efficiency information, the allowable range, and the process setpoint via wireless communications using the wireless communications device.

27. The control system of claim 23, the controller obtains at least a portion of one of the efficiency information, the allowable range, and the process setpoint from prior operation of the process.

28. The control system of claim 23, the controller is adapted to correlate component performance information associated with at least two components in the process in order to derive correlated process performance information, and to select the desired operating point as the optimum performance point within the allowable range of operation according to the correlated process performance information.

29. The control system of claim 28, the controller provides the control signal as a motor speed signal to the motor drive according to the desired operating point.

30. The control system of claim 28, the component performance information comprises at least one of life cycle cost information, efficiency information, life expectancy information, safety information, emissions information, operational cost information, MTBF information, noise information, and vibration information.

31. A control system for controlling a process having a pump with an associated motor, the control system comprising:
a motor drive adapted to provide electrical power to the motor in a controlled fashion according to a control signal; and
means for providing the control signal to the motor drive according to a desired operating point within an allowable range of operation about a process setpoint; and
means for selecting the desired operating point according to performance characteristics associated with a plurality of components in the process the performance characteristics comprises efficiencies of at least two of the motor, the pump, and the motor drive.

32. A control system for controlling a process comprising a motorized pump system having an electric motor coupled with a pump and an associated motor drive providing electrical power to the motor, comprising:
means for selecting a desired operating point as the optimum efficiency point within an CD allowable range of operation according to correlated process efficiency information, the correlated process efficiency information is derived from at least two of motor efficiency information, pump efficiency information, and motor drive information; and
means for providing a control signal to the motor drive according to the desired operating point.

33. A pump control system for automatically operating a pump driven by a motor in a controlled fashion, comprising:
a motor drive providing electric power to operate the motor in a controlled fashion according to a motor control signal; and
a controller comprising a diagnostic component that diagnoses an operating condition associated with the pump by performing signature analysis of at least one sensor signal from a sensor associated with the pump, the controller further provides the control signal to the motor drive according to a setpoint and a diagnostic signal from the diagnostic component according to the diagnosed operating condition in the pump.

34. The control system of claim 33, at least one sensor signal is related to one of flow, pressure, current, noise, vibration, and temperature associated with the pump.

35. A controller for providing a control signal to a motor drive to operate a motorized pump in a controlled fashion, comprising:
a diagnostic component operatively connected to the pump to diagnose an operating condition associated with the pump;
wherein the controller provides the control signal to the motor drive according to a setpoint and a diagnostic signal from the diagnostic component according to the diagnosed operating condition in the pump, the diagnostic component performs signature analysis on at least one of flow, pressure, current, noise, vibration and temperature associated with the pump.

* * * * *